Oct. 18, 1966  M. A. DEMARCO  3,279,419
SIGNAL BALLOON DEVICE
Filed May 3, 1965  4 Sheets-Sheet 1
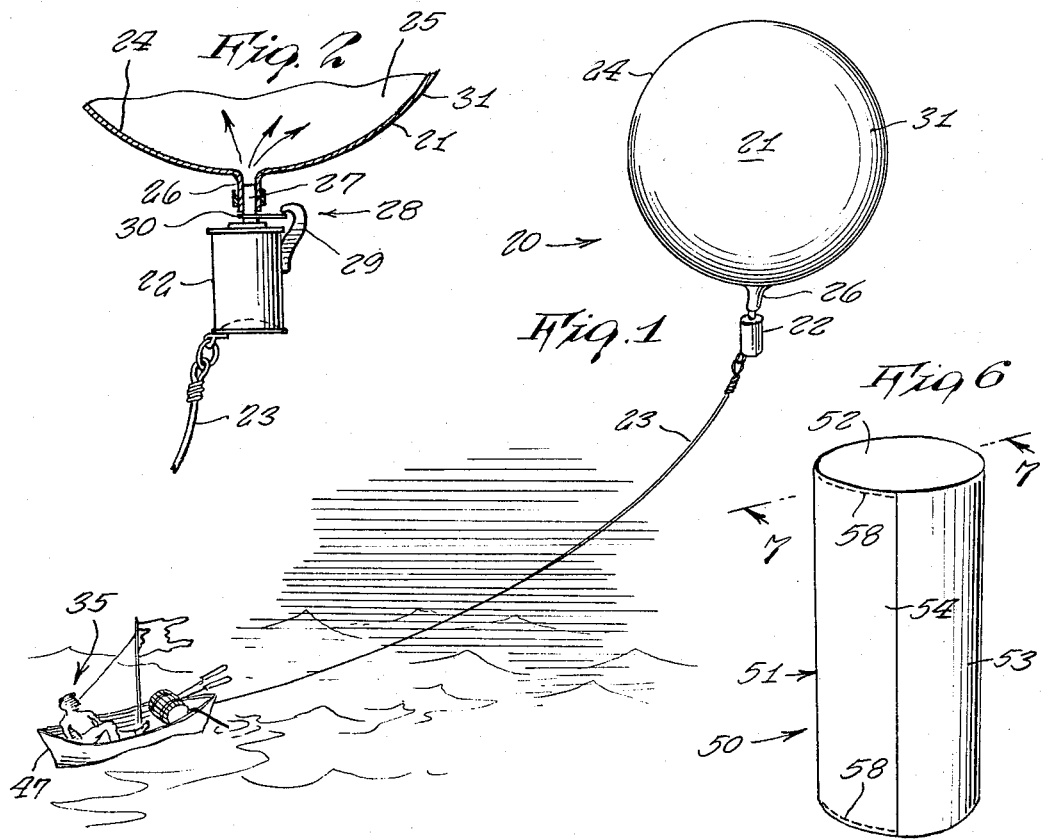
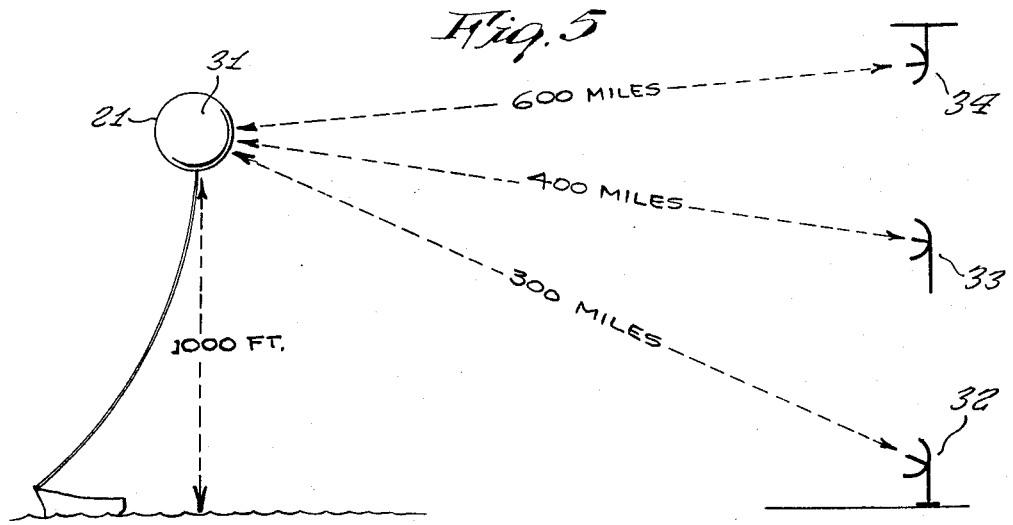
INVENTOR.
MICHAEL A. DEMARCO Oct. 18, 1966  M. A. DEMARCO  3,279,419
SIGNAL BALLOON DEVICE
Filed May 3, 1965  4 Sheets-Sheet 2
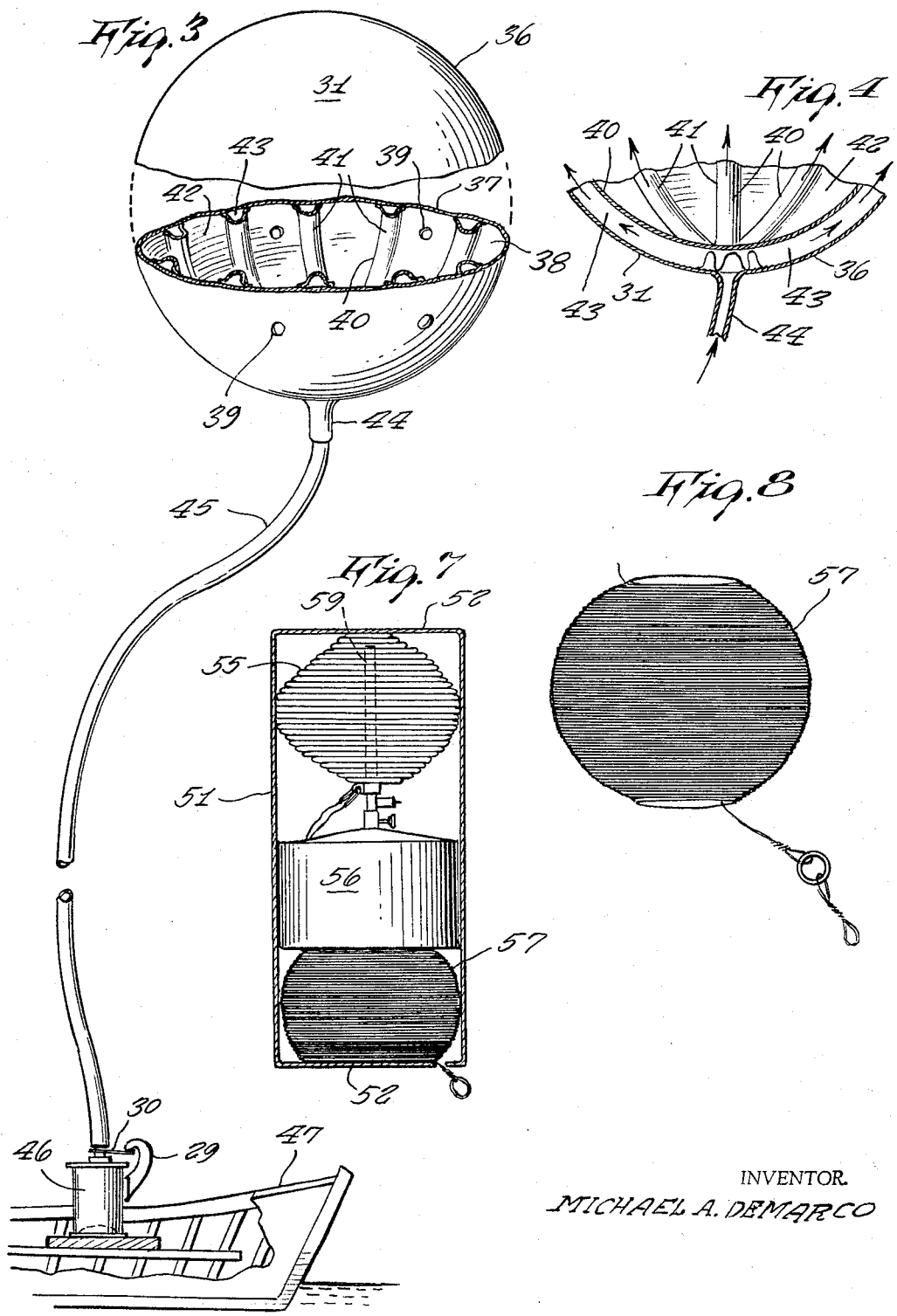
INVENTOR.
MICHAEL A. DEMARCO Oct. 18, 1966   M. A. DEMARCO   3,279,419
SIGNAL BALLOON DEVICE
Filed May 3, 1965  4 Sheets-Sheet 3
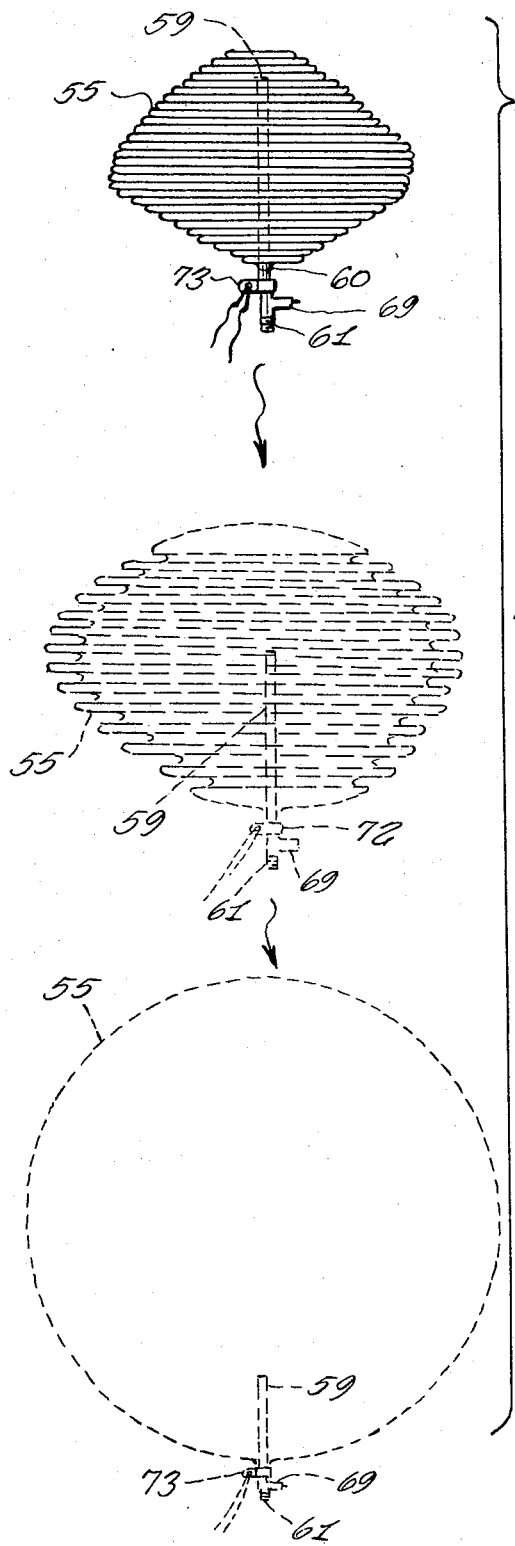
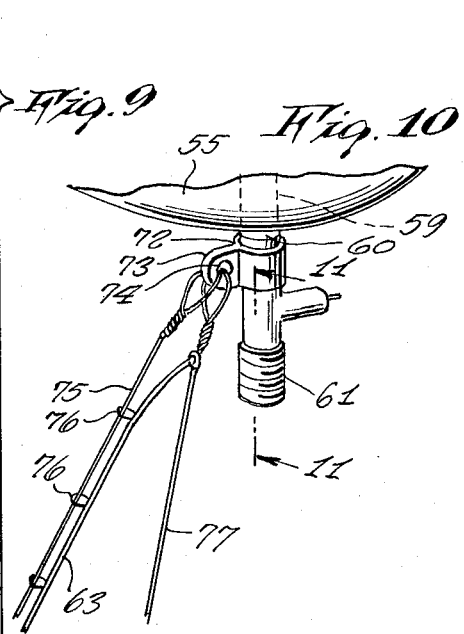
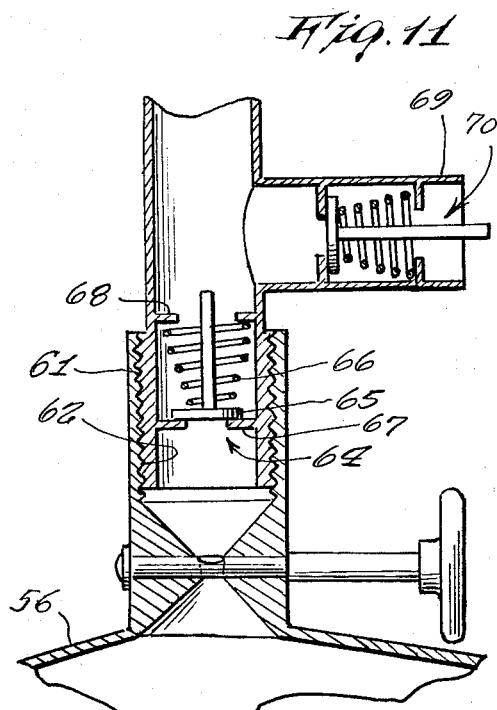
INVENTOR.
MICHAEL A. DEMARCO Oct. 18, 1966    M. A. DEMARCO    3,279,419
SIGNAL BALLOON DEVICE
Filed May 3, 1965    4 Sheets-Sheet 4
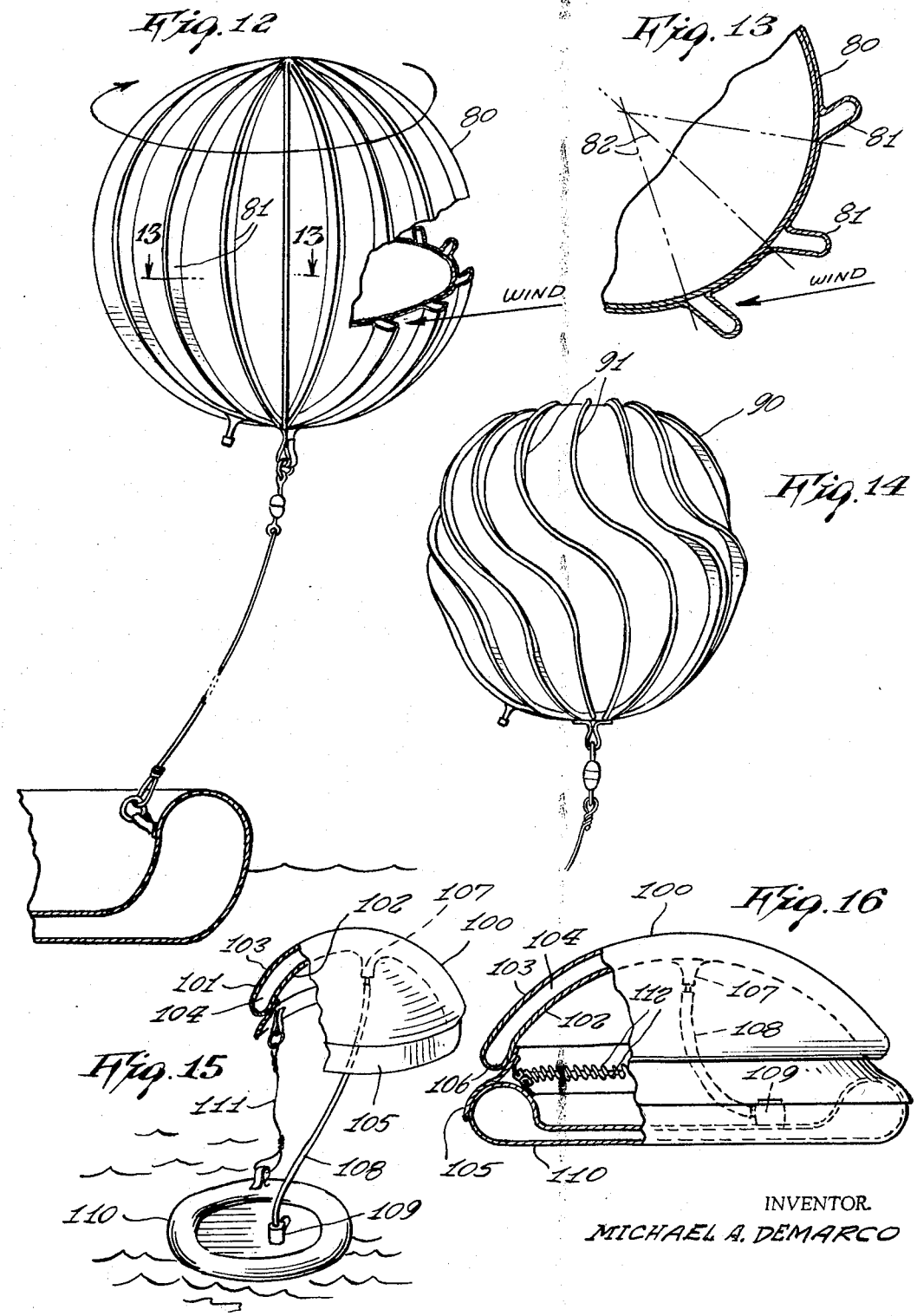
INVENTOR.
MICHAEL A. DEMARCO

United States Patent Office

3,279,419
Patented Oct. 18, 1966

3,279,419
SIGNAL BALLOON DEVICE
Michael A. Demarco, Brooklyn, N.Y.
(26 Roberts Drive, Staten Island, N.Y.)
Filed May 3, 1965, Ser. No. 452,523
4 Claims. (Cl. 116—124)

This invention relates generally to air-borne location indicators. More specifically it relates to air-borne distress signal devices.

It is generally well known that rescue operations can be particularly difficult when it is necessary to scan across an extensive range of the earth's terrain or sea surface in search of a party in distress. In such cases it is necessary that as large as possible a signal device is used so that it can be seen from a relatively great distance away. Of course large devices that may or may not become necessary to use are impractical to carry, particularly in cases where equipment must be carefully selected to keep weight down, such as by exploration parties, hunters and the like who must carry all their equipment. Accordingly, there has been a need to date for a relatively small compact signal device having improved means for being visible and/or detectable over enormous distances.

Thus it is a principal object of the present invention to provide a novel signal device that is compact and lightweight for easy and convenient transportation, improved means for being located from far away and which essentially comprises a balloon having a metallic outer surface that is capable of reflecting radar waves.

Another object is to provide means for raising the balloon high into atmosphere where it is free from obstructions for detection and which accordingly would indicate the direction to a party in distress even when the party is hidden by jungle overgrowth, by fog, or snowstorm and the darkness of night.

Another object is to provide a metallic surfaced balloon that can be maintained high in the atmosphere and which is tethered to the distress party on the ground so as to remain stationary overhead and serve as a marker for locating the distress party position therebelow.

Still another object is to provide a tethered balloon having a metallic surface that would be ideal for use by sportsmen and explorers in the wilderness, in the desert or in the snow covered arctic region, by boatsmen at sea, by army and navy branches of the armed services, by boy scouts, ranchers, airplane pilots, mountain climbers and the like.

Yet another object is to provide a metallic surfaced balloon that can be used to mark the location of debris, icebergs and other objects that obstruct the sea lanes for vessels at sea and wherein the course travelled by such icebergs or other objects can be constantly recorded.

Yet another object is to provide a metallic surfaced balloon that can be used to locate the positions of the fallen and wounded soldiers after battle.

Yet another object is to provide a metallic surfaced balloon that can be used to designate paths of sea lanes, or indicate a path to lost persons for travel out from an area, or places of safety to persons in danger.

Yet another object is to provide a metallic surfaced balloon that can mark the location of a space rocket capsule after landing.

A still further object is to provide a metallic surfaced balloon that can serve as a life preserver or buoy for maintaining a person or other object afloat at sea, and used in conjunction with said life preservers.

Another further object is to provide a metallic surfaced balloon that can serve as a canopy over a life raft at sea to keep out waves during a storm or wind and rain, and detectable at the same time by high flying radar equipped aircraft.

Another further object is to provide a metallic surfaced balloon that is inflatable.

Another further object is to provide a metallic surfaced balloon having internal ribs that are inflatable.

Another further object is to provide a metallic surfaced balloon having external ribs that are inflatable and wherein the ribs are angularly inclined respective to a radial direction so as to provide means for rotation of the balloon by wind currents.

Another further object is to provide a metallic surfaced balloon wherein the external ribs are additionally inclined respective to the horizon so as to provide lifting force thereto by the passing horizontal winds.

Other objects are to provide a metallic surfaced balloon that is simple in design, inexpensive to manufacture, rugged in construction, easy to use and efficient in operation.

These and other objects will be readily apparent upon a study of the following specification and the accompanying drawings wherein:

FIGURE 1 is a perspective view of the present invention shown in operative use.

FIGURE 2 is an enlarged fragmentary side view thereof shown partly in cross section.

FIGURE 3 is a perspective view partly in cross section of a modified form of the invention shown in operative use.

FIGURE 4 is a cross sectional view thereof taken on the line 4—4 of FIGURE 3.

FIGURE 5 is a diagrammatic side elevation view showing the effective radar response range of the present device.

FIGURE 6 is a perspective view of a container to house another form of the invention.

FIGURE 7 is a cross sectional view taken on line 7—7 of FIGURE 6.

FIGURE 8 is a side elevation view of a reel of cord providing a means for tethering the balloon to the earth.

FIGURE 9 is a side view of the balloon showing progressive steps in the inflation thereof.

FIGURE 10 is a perspective view of the balloon valve stem structure.

FIGURE 11 is an enlarged cross sectional view taken on line 11—11 of FIGURE 10.

FIGURE 12 is a side elevation view shown partly in cross section showing still another form of the present invention.

FIGURE 13 is an enlarged fragmentary cross sectional view taken on line 13—13 of FIGURE 12.

FIGURE 14 is a side elevation view of still another form of the present invention.

FIGURE 15 is a perspective view shown partly in cross section illustrating still another form of the present invention.

FIGURE 16 is a side elevation view thereof partly in cross section shown in another application of use wherein the balloon serves as a canopy over a life raft.

Referring now to the drawings in detail and more particularly to FIGURES 1, 2 and 5, the numeral 20 represents a Signal Balloon Device according to the present invention wherein there is a balloon 21, a pressure can 22 containing hydrogen or other appropriate gas under pressure and a tether cord 23. The balloon is comprised of a non-porous non-elastic shell 24 to prevent gas leakage therethrough, the balloon enclosing a central chamber 25 and having a stem 26 for fitting over a mouthpiece 27 of the canister 22. A release mechanism 28 on the canister includes a hook 29 for holding down a valve lever 30 to release the compressed hydrogen into the balloon. The outer surface of the balloon is covered with metalized substance 31 having capability of reflecting radar waves.

As shown in FIGURE 5 the balloon metalized surface is able to receive ground radar waves generated from ground radar device 32 up to 300 miles away, from high antenna radar tower 33 which is 400 miles away and from air-borne radar device 34 up to 600 miles away.

In operation the lever 30 is moved under the hook 29 to inflate the balloon which is then allowed to rise upward in the air while the cord secured to the canister attached to the balloon is retained at its other end by the distress party 35.

In FIGURES 3 and 4 a modified construction is shown wherein balloon 36 comprises a shell 37 enclosing central chamber 38. A plurality of openings 39 through the shell permit movement of air in and out of the chamber 38. In this form of the invention the balloon has internal ribs 40 each of which comprises a strip of non-porous, non-elastic tape 41 sealed along its edges to the inner side 42 of the shell and having a pocket 43 therebetween which communicates with stem 44. A hose 45 is connected at one end to the stem and at its other end to pressure can 46 containing hydrogen. In this form of the invention the pressure can is not air-borne but remains on the ground or life boat 47 as the case may be. The hydrogen is pumped through the hose into the ribs. This construction allows the use of a smaller quantity of hydrogen and the use of a larger balloon. The hose is of very lightweight plastic and thus with the can being not air-borne, the balloon is lighter and can be raised on the lesser quantity of hydrogen.

In FIGURES 6 through 11 a preferred and detailed form of construction is shown wherein the complete balloon apparatus 50 is contained within a carrying case 51 of cylindrical configuration having flat circular opposite end panels 52 and a side wall 53 which has a flap 54 that can be pulled so as to open the case and bring out the balloon 55, cannister 56 and cord reel 57, contained therein (as shown in FIGURE 7).

The case 51 is comprised of a cardboard member with tinfoil cover. The case has a row of perforations 58 along the upper and lower edges of the flap to facilitate ripping open the case in a rapid manner so as to expose the contents.

The metallic surface balloon 55 is stored in collapsed condition in the case. A flexible tube 59 is mounted within the stem 60 of the balloon, the tube upper end protruding into the balloon interior. The lower end of the tube is externally threaded as shown at 61 and fitted into the internally threaded end 62 of the cannister 56. A one way valve 64 is fitted into the lower end of the tube; the valve including a flat disc 65 forced by means of compression spring 66 against valve seat 67, the opposite end of the spring bearing against internal flange 68.

Near the lower end of the tube a sideward projecting valve housing 69 also contains a one way release valve 70 of similar construction. The release valve permits only discharge of gas outward from the tube while the valve 64 permits only admission of gas from the cannister into the tube.

The cannister 56 contains hydrogen under pressure. A hand operated valve at the upper end of the cannister permits release of hydrogen gas into the tube and balloon.

A collar 72 is fitted around the exposed portion of tube 59; the collar having a tab 73 with opening 74 therein to which a nylon cord 75 is secured. An insulated wire 63 is secured by means of loops 76 along the nylon cord, the opposite ends of the cord and wire being retained by the party in distress. An exposed antenna wire 77 is also secured to the tab 73.

The cord reel 57 as shown in FIGURE 8 is reeled so that the cord may be pulled out from the center as shown.

In FIGURE 12 a modified balloon 80 is shown wherein vertical ribs 81 are on the outer side of the balloon, the ribs being of fin-like generally flat configuration which extends outwardly from the balloon in an inclined direction respective to the balloon radius 82 as shown in FIGURE 13. This construction permits horizontally travelling winds to rotate the balloon. If the balloon has color patches on its outer side the rotation aids further in gaining attention of a search party.

In FIGURE 14 a similar construction is shown. However, here the balloon 90 has outer ribs 91 which additionally are inclined respective to an imaginary vertical longitudinal line on the outer surface of the balloon. These inclined ribs provide additional lift force to the balloon from passing horizontal winds which strike on the underside of the ribs.

In FIGURES 15 and 16 the balloon structure 100 is of hemispherical configuration and includes a shell 101 having a thin inner and outer wall 102 and 103 respectively between which is a chamber 104 containing hydrogen gas or other appropriate gas. An apron 105 is secured around the lower edge 106 of the balloon. A stem 107 at the apex underside of the balloon is secured to hose 108 connected to gas cannister 109 retained on life raft 110. An additional cord 111 between the life raft and balloon provides further securement to tether the balloon. In case of rain or other adverse weather, the balloon can be lowered directly on to the life raft as shown in FIGURE 16.

Slide fastener elements 112 around the perimeter of the balloon and life raft can be attached together to form a fairly tight seal between the ports to keep out wind, sea waves and the like.

In operative use radar waves from a searching party are reflected upon the metallic surfaced balloon to provide position indicating means.

While various changes may be made in the detail construction it is understood that such changes will be limited to the spirit and scope of the present invention as is defined in the appended claims.

I claim:

1. In a signal balloon device a combination of a storage case having an internal compartment containing a collapsed expandable vessel having an inlet for the introduction of a lighter than air gas, including a cannister containing a lighter than air gas under pressure operatively connected to the said inlet, wherein the outlet from the cannister is controlled by valve means, including a cord attached to the cannister adapted to be secured at one end, permitting the vessel and pressure cannister to ascend when the valve means has been actuated, to expand the said vessel with the lighter than air gas, and wherein the said vessel comprises a series of concentric peripheral braces of varying diameters superimposed upon each other, and connected together with a flexible material permitting the said braces to be expanded relative to each other to form an expanded vessel lighter than air when filled with lighter than air gas.

2. A signal balloon device as in claim 1, wherein the said concentric braces are of predetermined proportionate diameters, whereby when fully expanded with the lighter than air gas, will form a sphere.

3. A signal balloon device as in claim 2, wherein the valve means controlling the flow of gas from the cannister to the vessel, comprises a manually controlled valve, and a pressure operated check valve in series with the said manually operated valve, which will prevent the return flow of gas from the vessel to the cannister, and will regulate the amount of pressure in the vessel.

4. A signal balloon device as in claim 3, including a third valve controlling an orifice leading from the vessel inlet, which will permit the escape of excess pressure from the atmosphere to prevent bursting of the vessel in rarified atmospheres and high elevations.

References Cited by the Examiner

UNITED STATES PATENTS

| | | | |
|---|---|---|---|
| 1,396,489 | 11/1921 | Williams | 244—33 |
| 1,836,495 | 12/1931 | Paulson | 116—124.9 |
| 2,208,786 | 7/1940 | Astle | 244—153 |
| 2,486,158 | 10/1949 | Haas | 244—153 |
| 2,570,549 | 10/1951 | Hansell | 244—33 |
| 2,619,303 | 11/1952 | Martin | 244—33 |
| 2,629,115 | 2/1953 | Hansen | 244—33 |
| 2,646,019 | 7/1953 | Chetlan | 116—124.9 |
| 2,651,314 | 9/1953 | Hasselquist | 46—90 |
| 2,759,296 | 8/1956 | Freck | 46—87 |
| 2,778,332 | 1/1957 | Talbot | 116—124.9 |
| 2,825,803 | 3/1958 | Newbrough | 116—124.9 |
| 2,831,967 | 4/1958 | Bayze | 116—124.9 |
| 2,842,090 | 7/1958 | Samwald | 116—124.9 |
| 2,862,531 | 12/1958 | Walker | 116—124.9 |
| 2,923,917 | 2/1960 | McPherson et al. | 340—27 |
| 3,002,490 | 10/1961 | Murray | 116—124.9 |
| 3,182,932 | 5/1965 | Winker | 244—31 |

LOUIS J. CAPOZI, *Primary Examiner.*